United States Patent Office 3,500,932
Patented Mar. 17, 1970

3,500,932
USE OF MICELLAR SOLUTION TO PRECEDE SANDFRAC TREATMENTS
Thomas O. Webb, Tulsa, Okla., assignor to Marathon Oil Company, Findlay, Ohio, a corporation of Ohio
No Drawing. Filed Sept. 24, 1968, Ser. No. 762,141
Int. Cl. E21b *43/26*
U.S. Cl. 166—308
14 Claims

ABSTRACT OF THE DISCLOSURE

An improved method for fracturing a hydrocarbon-bearing subterranean formation is accomplished by injecting into the formation a micellar dispersion comprised of hydrocarbon, surfactant, and water previous to the injection of a fracturing fluid. Amounts within the range of 0.1 to about 10 barrels of a micellar dispersion per vertical foot of hydrocarbon-bearing formation are useful.

BACKGROUND OF THE INVENTION

Micellar dispersions are useful to displace hydrocarbon from subterranean formations, especially in a tertiary recovery process. Examples of such processes are taught in United States Patent Nos. 3,275,075 and 3,254,714 to Gogarty et al.

Hydrocarbon-bearing subterranean formations often are contaminated with cement, drilling mud, and foreign particles which adversely influence the production of hydrocarbon from the formation. Also, emulsification within the formation of filtrates from the drilling fluids with the formation fluids (hydrocarbons and/or water) can occur in the vicinity of the well bore, thereby adversely affecting the production of hydrocarbons from the formation. Further, treatment of wells, e.g. acidizing, sometimes causes emulsification within the immediate area of the well bore. One way of overcoming these adversities is to fracture the formation to facilitate the movement of hydrocarbons toward the well bore. This process "opens" or makes it easier for the hydrocarbons to flow through the formation toward the well bore. However, when fracturing the formation, it is sometimes difficult for the fracturing agent to enter the formation due to the contamination of cement, mud, etc. in the immediate area of the formation surrounding the well bore, emulsification in this area, etc. Such adversities also cause friction losses and require higher surface energy to fracture the formation.

To overcome these adversities of fracturing, a preslug of acid is often used. But, as mentioned previously this can cause emulsification of connate water and/or acid with the hydrocarbons within the formation.

An ideal precondition to fracturing is to have clean perforations, an overall clean formation, minimum emulsification, low or minimum contamination to reduce friction losses, etc. Also, it is desired to fracture a formation which is efficiently responsive to the fracturing process.

Applicants have discovered a new and improved fracturing process wherein a more efficient and economical fracture can be effected. This is accomplished by injecting a pre-slug of a micellar dispersion, the purpose of which is to clean the perforations and formation, minimize or inhibit emulsification and reduce surface tension and friction losses in the formation. From about 0.1 to about 10 barrels of a micellar dispersion per vertical foot of oil-bearing formation is useful for this invention. After the micellar dispersion is injected into the formation, the fracturing fluid is injected at a pressure sufficient to fracture the formation.

DESCRIPTION OF THE INVENTION

The term "micellar dispersion" as used herein is meant to include microemulsions (Schulman and Montagne, Annals of the New York Academy of Sciences, 92, pp. 366–371 [1961]), "transparent" emulsions, aqueous soluble oils, micellar dispersion technology taught by C. G. Sumner, Clayton's, The Theory of Emulsions and Their Technical Treatment, 5th edition, pp. 315–320 (1954), and micellar solutions. Examples of useful micellar dispersions are taught in United States Patent Nos. 3,254,714, 3,275,075 to Gogarty et al., and 3,307,628 to Sena.

Micellar dispersion is composed of hydrocarbon, aqueous medium, surfactant, and optionally cosurfactant and electrolyte. Examples of volume amounts include from about 4% to about 60% or more of hydrocarbon, from about 20% to about 90% aqueous medium, at least about 4% surfactant, from about 0.01% to about 20% or more of cosurfactant, and from about 0.001 to about 5% or more by weight, based on aqueous medium, of electrolyte. In addition, the dispersion can contain corrosion and/or scale inhibiting agents, bactericides, sequestering agents, oxygen scavengers, etc.

Examples of hydrocarbon include crude oil (both sweet and sour), partially refined fractions of crude oil, and refined fractions of crude oil. Specific examples include side cuts from crude columns, crude column overheads, gas oils, kerosene, heavy naphthas, naphthas, straight-run gasoline, liquefied petroleum gases, and pure hydrocarbons obtained from crude oil. The unsulfonated hydrocarbon in petroleum sulfonates is also useful as the hydrocarbon.

The aqueous medium can be soft, brackish, or brine water. Preferably, the water is soft, but can contain small amounts of salts which are compatible with the ions within the subterranean formation being fractured. Where a subterranean formation contains a high ionic content, it is preferred that the water be soft and the micellar dispersion be designed to have a large affinity for water containing a high ionic content.

Examples of surfactants useful with the micellar dispersion include nonionic, cationic, and anionic surfactants. Examples of such include sodium glyceryl monolaurate sulfate, dihexyl sodium succinate, hexadecylnaphthalene sulfonate, diethyleneglycol sulfate, glycerol disulfoacetate monomyristate, p-toluidene sulfate laurate, p-chloroaniline sulfate laurate, sodium sulfato oleylethylanilide, triethanolamine myristate, N-methyltaurine oleamide, pentaerythritol monostearate, polyglycerol monolaurate, triethanolamine oleate, morpholine stearate, hexadecyl trimethylammonium chloride, ditetradecyl dimethyl ammonium chloride, n-dodecyl-diethyleneglycol sulfate, monobutylphenyl phenol sodium sulfate, and triethanolamine laurate or triethanolamine oleate. Other useful surfactants include Duponol WAQE (a 30% active sodium lauryl sulfate marketed by DuPont Chemical Corporation, Wilmington, Delaware), Energetic W–100 (a polyoxyethylene alkyl phenol marketed by Armour Chemical Company, Chicago, Illinois), Triton X–100 (a polyoxyethylene phenol marketed by Rohm & Haas, Philadelphia, Pennsylvania) and Arquad 12–50 (a 50% active dodecyl trimethyl ammonium chloride marketed by Armour Chemical Company, Chicago, Illinois).

Preferably, the surfactant is a petroleum sulfonate, also identified as alkyl aryl naphthenic sulfonate. The sulfonate can contain monovalent, divalent or higher valency cations. Preferably, it is a monovalent sulfonate, examples include sodium and ammonium petroleum sulfonates having an average molecular weight within the range of from about 360 to about 520. The surfactant can be a mixture of low, medium and high molecular weight sulfonates or a mixture of two or more different surfactants.

The cosurfactant is also known as co-solubilizer and semi-polar organic compound. Examples include alcohols, amino compounds, esters, aldehydes, ketones, and like materials containing from 1 to about 20 or more carbon atoms, and more preferably from about 3 to about 16 carbon atoms. Preferably, the cosurfactant is an alcohol, specific examples include isopropanol, n- and isobutanol, amyl alcohols such as n-amyl alcohol, 1- and 2-hexanol, 1- and 2-octanol, decyl alcohols, alkaryl alcohols such as p-nonylphenol and alcoholic liquors such as fusel oil. Concentrations of from about 0.01 to about 5% by volume are especially useful in the micellar dispersion. Mixtures of two or more cosurfactants are also useful in micellar dispersions.

The electrolytes useful include inorganic bases, inorganic acids, inorganic salts, organic bases, organic acids, and organic salts which are strongly or weakly ionized. Preferably, the electrolytes are compatible with the ions within the formation and are inorganic bases, inorganic acids, and inorganic salts. Examples of useful electrolytes include sodium hydroxide, sodium chloride, sodium sulfate, hydrochloric acid, sulfuric acid, sodium nitrate, ammonium chloride, ammonium hydroxide, potassium chloride, and like materials. United States Patent No. 3,330,343 to Tosch et al. teaches specific electrolytes useful in micellar dispersions. The type and concentration of electrolyte will also depend upon the aqueous medium, surfactant, cosurfactant, hydrocarbon, and conditions (including temperature) of the reservoir. The salts within the aqueous medium are also useful as the electrolytes defined within this paragraph.

The mobility of the micellar dispersion should be about equal to or less than that of the mobility of the connate fluids within the formation. "Connate fluids" defines the combination of hydrocarbons and formation water within the subterranean formation. Such a mobility is desired to avoid fingering of the micellar dispersion into the formation and to obtain a more efficient and effective saturation of the micellar dispersion within the immediate area of the formation surrounding the well bore, e.g. within a fifteen-foot radius.

Enough micellar dispersion should be injected into the hydrocarbon-bearing formation to saturate the formation, i.e. substantially fill the pore volume of the hydrocarbon-bearing formation within the immediate vicinity, i.e. at least up to about fifteen feet radius, of the well bore. Generally from about 0.1 to about 10 barrels (42 gallons per barrel) of the micellar dispersion per vertical foot of hydrocarbon-bearing formation is useful to improve the fracturing process. However, it is contemplated that in some instances less than 0.1 and more than 10 barrels of the dispersion per vertical foot of hydrocarbon-bearing formation may be desired.

In addition, the micellar dispersion can be characterized as having graded mobilities from a low at the front portion of the micellar dispersion to a high at the back portion of the micellar dispersion. Also, the components within the micellar dispersion can be graded in concentrations from front to rear to give desired characteristics to the front and rear portions of the micellar dispersion. For example, a more hydrophilic surfactant can be used in the front portion of the micellar dispersion to give the front portion a more hydrophilic character than the back portion of the dispersion.

After the micellar dispersion is injected into the formation, the fracturing fluid is injected into the formation at a pressure sufficient to effect fracturing of the formation. Examples of fracturing fluids are numerous and are obvious to those skilled in the art. Such fracturing fluids include substantially hydrocarbon and substantially aqueous fracturing liquids containing propping agents, etc. It is desired that the micellar dispersion be designed to be compatible with the fracturing fluids and that no interaction between the two be effected to adversely affect the fracturing process.

It is intended that all equivalents obvious to those skilled in the art be equated with the invention and incorporated within the overall scope of the invention as defined within the specification and appanded claims.

What is claimed is:

1. A method of fracturing a subterranean hydrocarbon-bearing formation penetrated by a well, the method comprising
   (1) injecting into the formation from about 0.1 to about 10 barrels per vertical foot of hydrocarbon-bearing formation of micellar dispersion, and
   (2) then injecting into the formation a fracturing fluid under pressure sufficient to fracture said formation.
2. The method of claim 1 wherein the micellar dispersion is comprised of hydrocarbon, surfactant, and aqueous medium.
3. The method of claim 2 wherein the micellar dispersion contains a cosurfactant.
4. The method of claim 2 wherein the micellar dispersion contains electrolyte.
5. The method of claim 2 wherein the surfactant is petroleum sulfonate.
6. The method of claim 1 wherein the mobility of the micellar dispersion is about equal to or less than that of the formation fluids within the hydrocarbon-bearing subterranean formation.
7. The method of claim 1 wherein the fracturing fluid contains propping agents.
8. A method of fracturing a subterranean hydrocarbon-bearing formation penetrated by a well bore, the method comprising
   (1) injecting into the formation a micellar dispersion comprised of hydrocarbon, surfactant and aqueous medium to substantially saturate the effective pores of the formation up to about 15-feet radius of the well bore, and then
   (2) injecting into the formation a fracturing fluid under pressure sufficient to fracture the formation.
9. The process of claim 8 wherein the surfactant is a monovalent cation containing petroleum sulfonate having an average molecular weight within the range of from about 360 to about 520.
10. The process of claim 8 wherein the micellar dispersion contains cosurfactant.
11. The process of claim 8 wherein the micellar dispersion contains electrolyte.
12. The process of claim 8 wherein from about 0.1 to about 10 barrels of micellar dispersion per vertical foot of hydrocarbon-bearing sand is injected into the formation.
13. The process of claim 8 wherein the mobility of the micellar dispersion is about equal to or less than that of the formation fluids within the formation.
14. The method of claim 8 wherein the fracturing fluid contains propping agents.

References Cited

UNITED STATES PATENTS

| | | | |
|---|---|---|---|
| 2,802,531 | 8/1957 | Cardwell et al. | 166—308 X |
| 2,859,819 | 11/1958 | Trott | 166—308 |
| 2,869,643 | 1/1959 | Schuessler et al. | 166—308 |
| 2,927,639 | 3/1960 | Schuessler et al. | 166—308 X |
| 2,946,747 | 7/1960 | Kirkpatrick et al. | 166—308 |
| 3,254,714 | 6/1966 | Gogarty et al. | 166—274 |
| 3,275,075 | 9/1966 | Gogarty et al. | 166—274 |

STEPHEN J. NOVOSAD, Primary Examiner